(12) United States Patent
Cojocaru et al.

(10) Patent No.: US 11,215,307 B2
(45) Date of Patent: Jan. 4, 2022

(54) COUPLING DEVICE

(71) Applicant: EISELE GmbH, Waiblingen (DE)

(72) Inventors: Victor Cojocaru, Stuttgart (DE);
Andreas Nothdurft, Remshalden (DE)

(73) Assignee: EISELE GmbH, Waiblingen (DE)

( * ) Notice: Subject to any disclaimer, the term of this patent is extended or adjusted under 35 U.S.C. 154(b) by 281 days.

(21) Appl. No.: 16/098,196

(22) PCT Filed: Mar. 29, 2017

(86) PCT No.: PCT/EP2017/000384
§ 371 (c)(1),
(2) Date: Nov. 1, 2018

(87) PCT Pub. No.: WO2017/190824
PCT Pub. Date: Nov. 9, 2017

(65) Prior Publication Data
US 2019/0154180 A1 May 23, 2019

(30) Foreign Application Priority Data

May 2, 2016 (DE) ...................... 10 2016 005 303.8

(51) Int. Cl.
*F16L 37/18* (2006.01)
*F16L 37/56* (2006.01)

(52) U.S. Cl.
CPC .............. *F16L 37/18* (2013.01); *F16L 37/56* (2013.01)

(58) Field of Classification Search
CPC . F16L 37/12; F16L 37/18; F16L 37/20; F16L 37/122; F16L 37/1215; F16L 37/127
(Continued)

(56) References Cited

U.S. PATENT DOCUMENTS 1,481,392 A * 1/1924 Schawrow .............. F16L 37/16
285/88
4,003,614 A * 1/1977 Geer ....................... E05B 65/46
312/332.1
(Continued)

FOREIGN PATENT DOCUMENTS

CN 105065826 11/2015
DE 42 22 193 1/1993
(Continued)

OTHER PUBLICATIONS

International Search Report (ISR) dated Jun. 12, 2017 in International (PCT) Application No. PCT/EP2017/000384.

*Primary Examiner* — Aaron M Dunwoody
(74) *Attorney, Agent, or Firm* — Collard & Roe, P.C.

(57) ABSTRACT

A coupling device has two connector block parts (2,4), which can be coupled to each other and which have a plurality of receptacles for connector parts (10). The connector parts are arranged in correspondence with each other and can be connected to each other. A supporting device is provided for supporting the coupling process. The supporting device has, on the one connector block part (2), a pivotable handle (16) having at least one guide slot (30). At least one guide part (32) of the other connector block part (4) engages the guide slot (30) in such a way that, when the handle (16) is pivoted, the guide slot (30) applies a force to the guide part (2, 4) in such a way that the connector block parts (2, 4) are moved toward each other for a coupling process.

13 Claims, 2 Drawing Sheets

(58) Field of Classification Search
USPC ................ 285/26, 120.1, 312, 311, 310, 309
See application file for complete search history.

(56) References Cited

U.S. PATENT DOCUMENTS

| | | | | |
|---|---|---|---|---|
| 5,316,347 | A * | 5/1994 | Arosio | .................. E02F 3/3654 |
| | | | | 285/26 |
| 5,344,194 | A * | 9/1994 | Hatagishi | ......... H01R 13/62933 |
| | | | | 285/26 |
| 2005/0285390 | A1 * | 12/2005 | Martin | .................... F16L 37/56 |
| | | | | 285/124.5 |
| 2006/0130910 | A1 | 6/2006 | Knuthson | |

FOREIGN PATENT DOCUMENTS

| | | |
|---|---|---|
| DE | 10 2009 030 936 | 12/2010 |
| EP | 1 657 481 | 5/2006 |
| EP | 2 740 985 | 6/2014 |
| GB | 1 020 928 | 2/1966 |

* cited by examiner

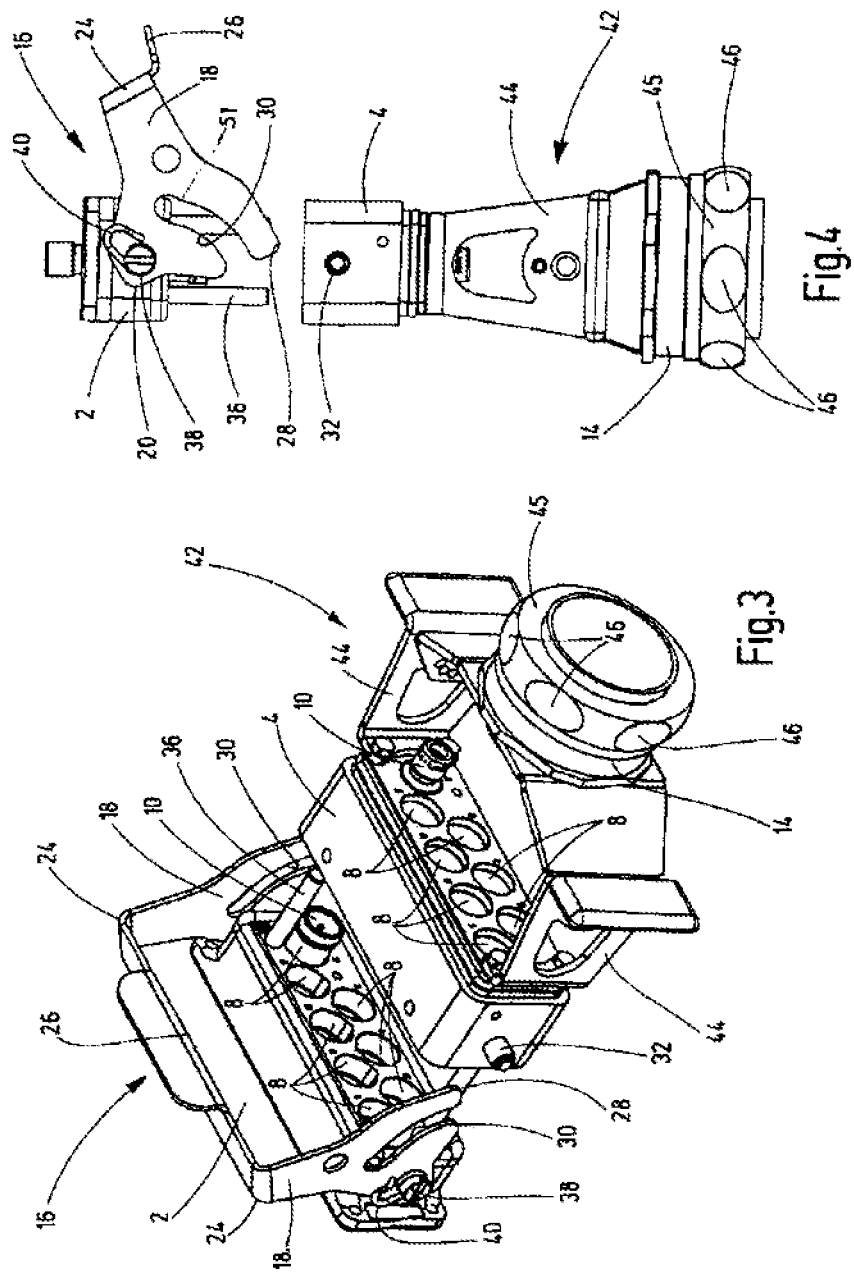

COUPLING DEVICE

FIELD OF THE INVENTION

The invention relates to a coupling device, comprised of two connector block parts that can be coupled to each other with a plurality of receivers for connector parts. The connector parts are arranged corresponding with each other and can be connected to each other.

BACKGROUND OF THE INVENTION

Coupling devices of this type belong to the prior art and are known as multiple media couplings or multiple couplings. For example, DE 10 2009 030 936 A1 describes a coupling device of this type. These coupling devices can have a larger number of connector parts, which can be plugged together for connecting line sections. These lines can be for flowable media, like compressed air, or can be electrical lines. In principle, and in particular in the case of line sections under pressure, a secure mutual sealing of the connector parts by a sealant is essential in the coupling state. Above all, in the case of a greater number of connector parts, a higher exertion of force can be required for carrying out the coupling process due to the friction on the sealants and because of the media pressure counteracting the connection.

SUMMARY OF THE INVENTION

With regard to this problem, the invention addresses the problem of providing a coupling device of the type specified in the introduction that facilitates a simple and comfortable implementation of the coupling process, even in the case of a greater number of connector parts.

According to the invention, this problem is solved by a coupling device having, as one essential special feature of the invention, a facilitating device, for facilitating the coupling process, having a pivotable handle with at least one guide slot on the one connector block part. At least one guide part of the other connector block part engages in the guide slot such that, when the handle is pivoted the guide slot applies a force to the guide part causing the connector block parts to be moved toward each other for a coupling process. In the case of an appropriately selected length of the lever arm formed on the handle between its manually graspable actuating end and the pivot point, a high force component acting in axial direction can be generated via the guide slot on the guide part engaging in it with a low amount of pivot torque to be applied to the handle by the operator. The coupling process then can be implemented with a low exertion of force. Therefore, in contrast to the aforementioned solution of the prior art, in which, in an effort to reduce the exertion of force in the coupling process, the respective sealant of the connector parts is arranged in a specially configured receiving groove permitting an axial movement, a sealing arrangement of random configuration can be used in the device of the invention.

In particularly advantageous exemplary embodiments, the pivotable handle encompasses the assignable connector block part in the manner of a bracket and has two side parts. The side parts of this connector block part, which are parallel and opposite each other, are pivotably arranged on the connector block part. Each side part has a guide slot extending parallel to each other, penetrating the respective side part in areas, and arranged in the respective side part. In this bracket design the actuating part of the handle can be formed by a cross-member extending between the two side parts. The actuation a grip part may then be formed by the cross-member with sufficient length in relation to the width of the bracket and can be grasped particularly conveniently.

With particular advantage, the respective guide part of the other connector block part can be formed by a guide pin. Two guide pins are arranged in pairs and in the same engagement position at side walls of the other connector block part. The two pins are arranged opposite such that they lie in the pivot path of the respective assignable guide slots when the connector block parts approach each other toward their coupling position. In the bracket design so arranged, the risk of jamming when bringing the connector block parts together is avoided, because, in the case of axial force generated simultaneously on opposing sides of the other connector block part, the connector block parts are brought together without diagonal pull.

With particular advantage, the assembly can be made such that the side parts with the guide slot are configured as a pivoting fork and connected to each other in pairs on one end via a plate-shaped or rod-shaped grip part. The guide slot on the opposing end of the respective side part for receiving the guide pin of the other connector block part opens outward. In the process, the guide path of the guide slot has a curved shape at least in the region of the opening and proceeding from it.

As a result, the pivoting movement of the side parts already leads to an axial force component on the guide pin at the start of the coupling process.

Advantageously the assembly can be made such that, at least on one pivot axis on the one connector block part, the pivotable side part remains positioned in a force-locking manner by a pretensioning device, preferably in the form of at least one yoke spring, in every pivotal position. As a result, loose pivoting movements of the side parts are prevented, even in states without engagement of the guide pin in the respective guide slot.

The connector block parts, as is the case with the mentioned solution according DE 10 2009 030 936 A1 in the prior art, can be configured as round bodies or as cuboids in a type of box design.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 3 is an exploded, perspective view of a coupling device according to a second exemplary embodiment of the invention; and FIG. 4 is an exploded, side view of the coupling device of FIG. 3.

DETAILED DESCRIPTION OF THE INVENTION

Figure 2:
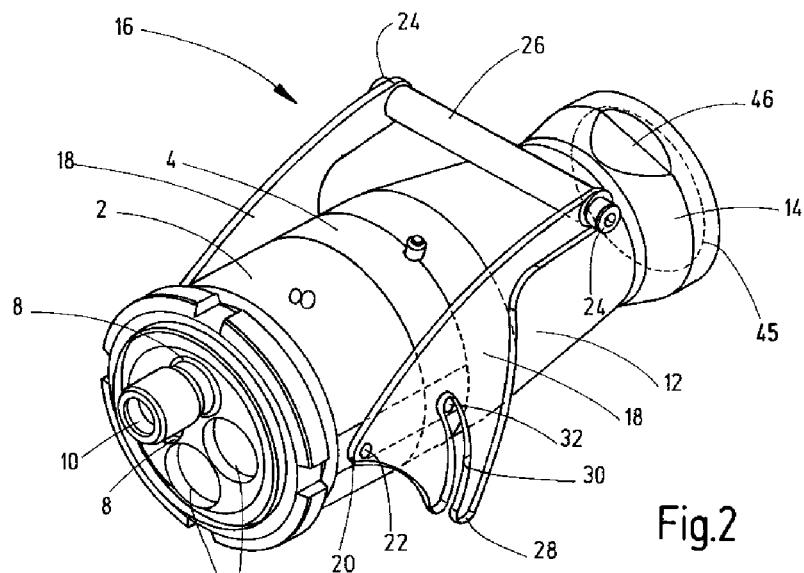
FIG. 2 is a perspective view of the coupling device of FIG. 1 in the completely coupled state.
Figure 1:
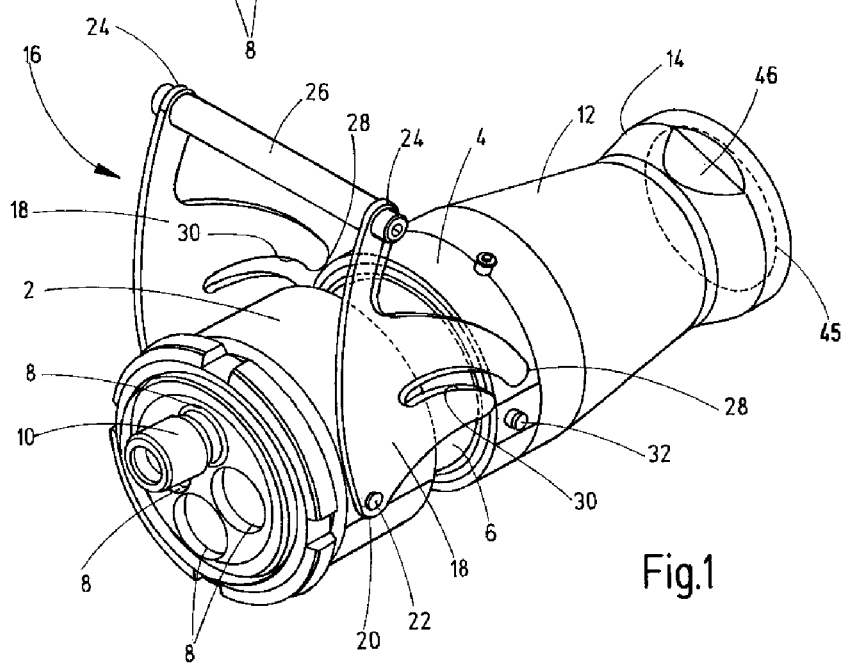
FIG. 1 is a perspective view of a coupling device according to a first exemplary embodiment of the invention in the incompletely coupled state.

With reference to FIGS. 1 and 2, the coupling device according to the first exemplary embodiment of the invention forms on the whole a round or cylindrical element. As in the aforementioned prior art (DE 10 2009 030 936 A1), the first connector block part 2, which is visible at the front in FIGS. 1 and 2, is designed in the manner of a coupling socket. A shell part 6 of the second connector block part 4, which is reduced in its external diameter, can be inserted into the first connector block 2 when the device is transferred from the incompletely coupled state shown in FIG. 1 to the completely coupled state shown in FIG. 2. Corresponding to the prior art, in the coupled state receivers are aligned perfectly to each other, which receivers are provided in connector block parts 2 and 4 for connector parts affixed to the ends of line sections to be connected to each other.

In the illustrations of FIGS. 1 and 2, four receivers 8 are provided for connector parts 10. In FIGS. 1 and 2, three of the receivers 8 have been left empty, and only one inserted connector part 10 is visible, which is shown without an associated line section. In the coupling state, the connector parts 10 of the one connector block part 2 have been brought together with the connector parts 10 of the second connector block part 4, wherein a sealant forms the seal between the connector parts 10. In the exemplary embodiment of FIGS. 1 and 2, the second connector block part 4 is extended by an attachment 12, which extends with slightly conical taper to a line guide part 14, which forms the exit for a relevant bundle of lines (not shown) in the figure.

A facilitating device, which facilitates the carrying out of the coupling process for the operator, has a handle bracket 16. The handle bracket is designed in the form of a pivot arm, which has two identically configured side parts 18 in the form of sheet metal plates. Each side part 18 has one end 20 on one of the two opposing sides of the first connector block part 2. Each end 20 is pivotably mounted on a pivot pin 22 around a pivot axis. On the ends 24 opposite the ends 20 with the pivot pins 22, the side parts 18 are connected to each other by a round bar 26 forming a grip part or handle. In the area between the ends 20 and 24, the side parts 18 each have an extension 28 protruding towards the second connector block part 4, in which a slot 30 is formed. Each slot 30 forms a guide slot and is open in the region of the end of the extension 28. The guide slots formed by the slots 30 of the side parts 18 serve as control elements for guide pints 32. The control elements or guide pins 32 project coaxially on opposing sides of the second connector block part 4.

In the implementation of a coupling process, the guide pins 32, proceeding from the state shown in FIG. 1 upon pivoting the handle 16 clockwise, enter into the slots 30 from their open ends. For their function as guide slots, the slots 30, proceeding from their openings, are curved in the shape of a bow. In the case of a progressing pivoting movement of the side parts 18, the guide pins 32 move along the slots 30. A force component then develops on the guide pins 32 in axial direction, pulling the connector block parts 2 and 4 against each other, so that the coupling device reaches the coupling state. In the case of the leverage ratio, as given by the distance between a pivot pin 22 and end 24 of the respective side part 18 and by the shape of the slots 30, which determine the pitch of the guide slot, a pivot actuation of the handle 16 can be comfortably performed with low actuating force resulting in a high axial force for a secure coupling process.

FIGS. 3 and 4 show a second exemplary embodiment. In contrast to the first exemplary embodiment, the first and second connector block parts 2 and 4 are not formed by round or cylindrical bodies, but rather in the manner of a box design in the form of cuboids. The receivers 8 for the respective connector parts 10 are located in the connector block parts 2, 4. As in the first example, of the existing receivers 8 only one receiver 8 is shown equipped with one connector part 10 in each case for each connector block part 2 and 4. In FIGS. 3-4, the connector parts 10 are for electrical line sections (not shown). In bringing the connector block parts 2 and 4 together in the coupling process, one guide rod 36 each is provided on the first connector block part 2 near each short side of the rectangular shape. The guide rods 36 engage in guide bores (not visible in the figure) in the second connector block part 4 in the coupling process.

As in the first described example, the facilitating device facilitating the coupling process is in formed in a corresponding manner by a handle 16 in a bracket design with the side parts 18 configured the same as described in the first exemplary embodiment. Unlike the first exemplary embodiment, the grip part 26 connecting the ends 24 of the side parts 18 is formed not by a round bar, but rather is formed by a cross-member in one piece with the side parts 18. As in the first example, protruding guide pins 32 are provided for the interaction with the guide slots formed by the slots 30 of the side parts 18 on both sides of the second connector block part 4. As shown in particular in FIG. 4, each slot-shaped guide slot 30 has a recess or bulge 51 on the rear end protruding towards the grip part. Each bulge 51 is to be bridged and locks the bracket in the form of the handle 16, so that in the coupled state it is secured against unintentional loosening without third party interference. The force is applied to seal over the distance to be bridged.

For formation of the pivot axis for the side parts 18, the second exemplary embodiment has pivot bearings with screws 38 in place of the pivot pins 22, with which yoke springs 40 are held. Each yoke spring 40 is in contact with the exterior of the relevant side part 18 under a pre-tensioning force. The handle 16 is secured in a force-locking manner against unwanted pivoting movements as a result, when the connector block parts 2 and 4 are not coupled and the handle 16 is therefore free. In the second exemplary embodiment, a guide bracket 42 is provided as the guide for a bundle of lines extending away from the second connector block part 4. The bundle of lines (not shown in the figure) is in place of the attachment 12 provided in the first exemplary embodiment with exit guide part 14. The guide bracket has two lateral flanges 44, which are screwed into the second connector block part 4. The exit guide part 14 is located at the end of the flanges 44, just as it is also arranged at the end of the attachment 12 of the second connector block part 4 in the first exemplary embodiment. As in the first exemplary embodiment, the guide part 14 has flat sections 46 on an external threaded ring 45. The flat sections form the points of application for turning the threaded ring 45.

While various embodiments have been chosen to illustrate the invention, it will be understood by those skilled in the art that various changes and modifications can be made therein without departing from the scope of the invention as defined in the claims.

The invention claimed is:

1. A coupling device, comprising:
   first and second connector block parts being capable of being coupled to one another and having receivers supporting mating connector parts;
   a facilitating device supporting coupling of the first and second connector block parts and having a pivotable bracket on the first connector block part and two guide parts on the second connector block part, the pivotable bracket having two parallel side parts on opposite sides of the first connector block part, each of the side parts having a pivotable connection coupled to the first connector block part and having an identical curved guide slot extending from an opening in the respective side part, the guide parts extending from opposite sides of the second connector block part and being receivable in the openings and slidable along the curved guide slots as the bracket pivots drawing the first and second connector block parts toward one another;

a handle extending between and fixedly connected to ends of the side parts remote from ends of the side part with the pivotable connections; and an attachment extending on the second connector block and conically tapering from a line guide part forming an exit for a bundle of lines;

wherein said guide parts comprise separate guide pins extending coaxially from the opposite side of the second connector block part.

2. The coupling device according to claim 1 wherein
the handle comprises at least one of a plate-shaped or rod-shaped grip part;
the openings in the side parts face the guide pins; and
the curved guide slots are between the pivotable connections and the ends of the side parts connected to the handle.

3. A coupling device according to claim 1 wherein
the pivotable bracket is biased by a pretensioner toward a locking position of the pivotable bracket.

4. A coupling device according to claim 3 wherein
the pretensioner is a yoke spring.

5. A coupling device according to claim 1 wherein
the first and second connector block parts comprise a matching pair of cylindrical bodies.

6. A coupling device according to claim 1 wherein
the first and second connector block parts comprise a matching pair of cuboid bodies.

7. A coupling device according to claim 1 wherein
the guide slots comprise radially extending recesses at ends of the curved guide slots remote from the openings, the recesses receiving and releasably retaining the guide parts in locked positions in the curved guide slots with the first and second connector block parts coupled.

8. A coupling device according to claim 1 wherein
the curved guide slots extend in the side parts entirely within lengths of the side parts between the pivotable connections and the ends of the side parts connected to the handle.

9. A coupling device according to claim 1 wherein
the guide parts only slide along the curved guide slots during coupling of the first and second connector block parts.

10. A coupling device, comprising:
first and second connector block parts being capable of being coupled to one another and having receivers supporting mating connector parts;
a facilitating device supporting coupling of the first and second connector block parts and having a pivotable bracket on the first connector block part and two guide parts on the second connector block part, the pivotable bracket having two parallel side parts on opposite sides of the first connector block part, each of the side parts having a pivotable connection coupled to the first connector block part and having an identical curved guide slot extending from an opening in the respective side part, the guide parts extending from opposite sides of the second connector block part and being receivable in the openings and slidable along the curved guide slots as the bracket pivots drawing the first and second connector block parts toward one another;

a handle extending between and fixedly connected to ends of the side parts remote from ends of the side part with the pivotable connections; and the guide slots being curved in shapes of bows such that during progressing pivoting movement of the pivotable bracket with the handle moving towards the second connector block part the guide parts move along the guide slots and the first and second connector block parts are pulled against each other to a coupled state of the coupling device;

wherein said guide parts comprise separate guide pins extending coaxially from the opposite side of the second connector block part.

11. A coupling device, comprising:
first and second connector block parts being capable of being coupled to one another and having receivers supporting mating connector parts;
a facilitating device supporting coupling of the first and second connector block parts and having a pivotable bracket on the first connector block part and two guide parts on the second connector block part, the pivotable bracket having two parallel side parts on opposite sides of the first connector block part, each of the side parts having a pivotable connection coupled to the first connector block part and having an identical curved guide slot extending from an opening in the respective side part, the guide parts extending from opposite sides of the second connector block part and being receivable in the openings and slidable along the curved guide slots as the bracket pivots drawing the first and second connector block parts toward one another;

a handle extending between and fixedly connected to ends of the side parts remote from ends of the side part with the pivotable connections; and the pivotable bracket being biased by a pretensioner toward a locking position of the pivotable bracket;

wherein said guide parts comprise separate guide pins extending coaxially from the opposite side of the second connector block part.

12. A coupling device according to claim 11 wherein
the pretensioner is a yoke spring.

13. A coupling device, comprising:
first and second connector block parts being capable of being coupled to one another and having receivers supporting mating connector parts;
a facilitating device supporting coupling of the first and second connector block parts and having a pivotable bracket on the first connector block part and two guide parts on the second connector block part, the pivotable bracket having two parallel side parts on opposite sides of the first connector block part, each of the side parts having a pivotable connection coupled to the first connector block part and having an identical curved guide slot extending from an opening in the respective side part, the guide parts extending from opposite sides of the second connector block part and being receivable in the openings and slidable along the curved guide slots as the bracket pivots drawing the first and second connector block parts toward one another;

a handle extending between and fixedly connected to ends of the side parts remote from ends of the side part with the pivotable connections; and a pretensioner applies a force to the pivotable bracket retaining a position of the pivotable bracket in every pivotable position thereof in a force-locking manner;

wherein said guide parts comprise separate guide pins extending coaxially from the opposite side of the second connector block part.

\* \* \* \* \*